(12) United States Patent
Bachhofner et al.

(10) Patent No.: US 8,608,176 B2
(45) Date of Patent: Dec. 17, 2013

(54) SEALING ARRANGEMENT

(75) Inventors: Thomas Bachhofner, Guntramsdorf (AT); Stephane Hörner, Atzenbrugg (AT)

(73) Assignee: Andritz AG, Graz (AT)

( * ) Notice: Subject to any disclaimer, the term of this patent is extended or adjusted under 35 U.S.C. 154(b) by 686 days.

(21) Appl. No.: 12/226,757

(22) PCT Filed: Mar. 30, 2007

(86) PCT No.: PCT/EP2007/002904
§ 371 (c)(1),
(2), (4) Date: Sep. 18, 2009

(87) PCT Pub. No.: WO2007/124830
PCT Pub. Date: Nov. 8, 2007

(65) Prior Publication Data
US 2010/0013167 A1    Jan. 21, 2010

(30) Foreign Application Priority Data
Apr. 28, 2006 (AT) ..................... 734/2006

(51) Int. Cl.
*F16J 15/18* (2006.01)
*F16J 15/32* (2006.01)

(52) U.S. Cl.
USPC .............. 277/512; 277/562; 277/563

(58) Field of Classification Search
USPC ............. 277/512–513, 553, 558, 562, 563
See application file for complete search history.

(56) References Cited

U.S. PATENT DOCUMENTS

| | | | | |
|---|---|---|---|---|
| 2,678,839 A | * | 5/1954 | Richardson et al. | 277/558 |
| 3,013,826 A | * | 12/1961 | Sharp | 277/529 |
| 3,334,906 A | * | 8/1967 | Arnold | 277/581 |
| 3,726,531 A | * | 4/1973 | Pagan et al. | 277/563 |
| 4,094,512 A | * | 6/1978 | Back | 277/320 |
| 4,222,575 A | * | 9/1980 | Sekiguchi et al. | 277/558 |
| 4,448,425 A | * | 5/1984 | von Bergen | 277/545 |
| 4,890,849 A | * | 1/1990 | Eason | 277/422 |
| 4,922,719 A | * | 5/1990 | Arbuckle | 60/562 |
| 5,199,718 A | * | 4/1993 | Niemiec | 277/552 |
| 5,219,434 A | * | 6/1993 | Von Bergen et al. | 277/351 |
| 5,562,406 A | * | 10/1996 | Ooka et al. | 415/112 |

(Continued)

FOREIGN PATENT DOCUMENTS

DE         40 39 666 A1    6/1992
DE    10 2005 019 654 A1    1/2006

(Continued)

*Primary Examiner* — Vishal Patel
(74) *Attorney, Agent, or Firm* — Alix, Yale & Ristas, LLP

(57) ABSTRACT

A sealing arrangement for the sealed leadthrough of rotating shafts (2) through housing bores of housings (1) comprises at least one lip seal (3, 8, 14, 15) with a sealing lip that faces toward the area normally under higher pressure. In order to extend substantially the area of application of sealing arrangements with lip seals and by doing so, to make use of the sealing arrangement to achieve its advantages of being more economical, more durable also at pressure peaks, easier to install, and easier to maintain, also at higher pressures and pressure fluctuations, the lip seal (3, 8, 14, 15) on the side (5) facing the area with higher pressure is under a constant pressure that is higher than the highest pressure occurring inside the housing (1), and a gap (7, 10) that throttles the outflow is provided between this area and the inside of the housing.

12 Claims, 2 Drawing Sheets

(56) References Cited

U.S. PATENT DOCUMENTS

| | | | |
|---|---|---|---|
| 5,643,026 A * | 7/1997 | Pietsch et al. | 440/112 |
| 6,161,834 A * | 12/2000 | Pollack et al. | 277/300 |
| 6,481,720 B1 * | 11/2002 | Yoshida et al. | 277/400 |
| 2004/0245728 A1 * | 12/2004 | Armour et al. | 277/549 |

FOREIGN PATENT DOCUMENTS

| | | |
|---|---|---|
| EP | 335 368 A1 | 4/1989 |
| EP | 0 480 694 A1 | 4/1992 |
| EP | 1 055 849 A2 | 4/2000 |

* cited by examiner

SEALING ARRANGEMENT

BACKGROUND

The present invention relates to a sealing arrangement for the sealed leadthrough of rotating shafts through bore holes in housings, comprising at least one lip seal with a sealing lip.

Lip seals are used in many applications in which rotating shafts are run in a sealed arrangement into or out of housings, for example at propeller drive shafts in boat engines, as disclosed in EP 335 368 A1. Here, as in the sealing ring according to EP 1 055 849 A2, the sealing lip faces the area that is normally under lower pressure. In the latter case, measures are implemented to maintain the same pressure on both sides of the sealing lip, however this pressure maintained at a constant level. Lip seals are also known, for example from DE 40 39 666 A1, that are not under pressure at all.

Further, EP 0 480 693 A1 describes a shaft sealing arrangement between chambers with different pressures, for example in pumps or turbines, where mixing of the fluids on either side should be avoided. This is achieved by a fluid with a higher pressure being fed into the seal, which then exits on either side of it. Devices of this kind cannot be used, however, if an absolute seal is to be created in at least one direction, for example towards the atmosphere.

Very simple and low-cost lip seals for sealing shafts are also used in the paper industry for small refiners, however the sealing lip here usually faces the area under higher pressure in order to prevent the medium from escaping from the refiner. Inside these devices for shredding wood chips in the process for making paper pulp there are larger and smaller fluctuations in pressure. Since, however, lip seals are sensitive to higher fluctuations in pressure and can easily start to leak, they can only be used at low pressures or low pressure fluctuations. In the case of refiners, the ratio between inside and outside pressure lies between approximately 1.2 and 1.5 to 1.

A further application, which requires however at least two lip seals mounted in series, is described in DE 10 2005 019 654 A1. Here, a pressurizing means is pressed into the space between the lip seals, however no indication can be found of how this pressure is maintained or how constant it is, which is also due to this state of the art concentrating entirely on sealing problems as a result of contaminants on the lip seals. On the other hand, the lip seal closest to the inside of the housing is—only as an additional measure—flushed with very large quantities of pressurizing means that flow into the inside of the housing with little throttling in order to remove contaminants from the area of the lip sealing arrangement.

In large refiners with higher pressures and generally when larger pressure fluctuations occur, axial face seals are used. Axial face seals are very expensive, as well as being brittle due to the hard-hard combination, and can break at high pressure peaks, meaning that the plant must be shut down immediately. A further method of sealing to be mentioned is the stuffing box, which has also been known for a long time. The disadvantage of stuffing boxes is that they always have some leakage, they are difficult to adjust in order to obtain a good compromise between sealing and leakage, as well as not too much resistance to rotation by the shaft—which is needed however to lubricate and cool the seals.

SUMMARY

The object of the present invention is to extend substantially the area of application of sealing arrangements with lip seals and by doing so, to make use of the sealing arrangement to achieve its advantages of being more economical, more durable also at pressure peaks, easier to install, and easier to maintain, also at higher pressures and pressure fluctuations.

In order to achieve this object, the known sealing arrangement described above is improved by the sealing lip facing the inside of the chamber, where the lip seal between the side facing the inner part of the chamber and the inside of the housing has a gap that throttles the outflow. As a result, a constant differential pressure is maintained in any event by means of the sealing arrangement so that pressure fluctuations leading to leaks cannot affect the lip seal, which thus remains leak-tight.

In one aspect, a sealing arrangement is provided for a rotating shaft through a bore penetrating a housing, the housing having an inside with medium at elevated pressure and an outside at ambient pressure, the bore having an inner side facing the shaft and receiving at least one lip seal and an outer side exposed to ambient air. A pressurized fluid chamber is situated within the bore adjacent the shaft and a gap along the shaft provides fluid communication between the chamber and the inside of the housing. At least one lip seal has a sealing lip in contact with the shaft and facing the chamber; wherein the gap throttles outflow of pressurized fluid from the chamber to the inside of the housing and thereby loads the sealing lip against the shaft.

According to an advantageous embodiment of the invention, at least two lip seals can be arranged in series, forming several chambers, in order to extend the pressure area that can be sealed by means of an arrangement according to the invention. If at least two lip seals are arranged in series, each of the lip seals on the side facing the area which is normally under higher pressure is subjected to a constant pressure that does not exceed a maximum value that can be pre-set, where the maximum value at the innermost lip seal is higher than the highest pressure occurring inside the housing and the pressure differential of the maximum pressures at each lip seal does not exceed a value that can be pre-set. Thus, there is always a constant pressure differential at each lip seal in the arrangement, where the maximum pressure of each of the lip seals is not exceeded due to the cascading arrangement. A lip seal can withstand a constant pressure differential of up to approximately 2 bar, so that pressure differentials beyond 2 bar can also be sealed by including several stages in series. As a result, shafts with a very large diameter (approx. 2 m) and also with high speeds (approx. 1500 r.p.m.) can be sealed off, with relative speeds of around 15 to 25 m/sec between shaft and seal.

In order to be able to apply pressure to the or to each lip seal easily and safely, the or each lip seal is mounted preferably in a groove-like recess facing the rotating shaft inside the housing bore and has at least one passage in each case that can be connected to a pressure source on the side of one or several of the lip seals facing the inner part of the chamber. By means of the pressure-controlled supply of a medium, preferably at least one medium used in the process, constant pressurizing of the lip seals can be achieved easily, without any moving parts, thus having optimum functional reliability. The pressure build-up is then achieved due to the narrow passage between the lip seal and the area with higher pressure and the pressure drop occurring there, respectively. An additional advantage is the flushing effect of this embodiment because the medium introduced flushes back any particles that may have entered the gap between shaft and housing, thus protecting the sealing arrangement, the shaft and the housing against wear.

To be able to also build up pressure via the medium supply independently of a special arrangement of the installation area of the sealing arrangement, for example if stuffing boxes or axial face seals are replaced by an arrangement according to the invention, a further advantage can be realized in that a throttle ring can also be placed in the recess inside the housing bore, at least of the lip seal nearest to the inside of the chamber on the side facing the inside of the chamber. Thus, in this case the throttle ring provides for throttled outflow of the medium from the area between the lip seal and the area with higher pressure, and thus for pressure build-up and pressurizing of the lip seal. The throttle ring can be designed independently of the lip seal, can be very soft, and its material can be adapted to the chemical conditions in the inner chamber.

According to a first embodiment, this design is characterised by at least one passage that can be connected to the pressure source leading to the chamber between this throttle ring and the lip seal.

According to a further embodiment, the throttle ring can also be provided with at least one, preferably radial, bore, and the passage that can be connected to the pressure source is connected to the chamber between throttle ring and lip seal through this at least one radial bore in the throttle ring.

If, according to a further embodiment, a passage leads from the intermediate chamber to the outside between two lip seals located away from the chamber, through which passage medium escaping from the chamber is discharged, any medium or also process fluid escaping can be discharged in an orderly manner.

It is an advantage with such a design to also check and monitor the tightness of the sealing arrangement if the passage for discharge of escaping medium is provided with a sensor device for this medium or is connected to one.

The housing has at least one passage that can be connected to a pressure source and leads to the area of the or each seat that is closer to the area that is normally under higher pressure. As a result, a medium to pressurize this sealing arrangement can be fed in before the lip seal to be inserted at a pressure adjusted to be constant in order to guarantee optimum and constant tightness by the arrangement.

Discharge of any medium or process fluid that nevertheless escapes through the lip seal can be conducted safely if a further passage for discharge of medium escaping from the area that normally has higher pressure begins at a section of the seat located away from the area that is normally under higher pressure.

Advantageously, a sensor device for this medium is provided in the further passage for discharge of medium escaping.

BRIEF DESCRIPTION OF THE DRAWING

In the following description the invention is disclosed in more detail by embodiment examples shown in the attached drawing, in which.

DETAILED DESCRIPTION

Figure 1:
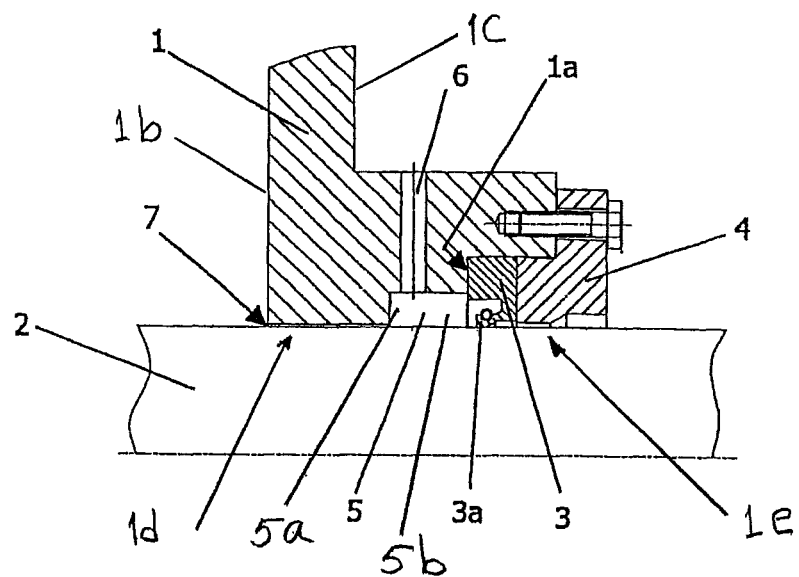
FIG. 1 shows a sealing arrangement with a single lip seal in a sectional view.

FIG. 1 shows a sectional view through a housing 1 with a sealing arrangement according to an aspect of the invention, which sealing arrangement is intended for sealed leadthrough of the rotating shaft 2 through an opening in the housing 1. In the very simple example shown, the sealing arrangement comprises a single lip seal 3 with a sealing lip 3a facing the area that is normally under higher pressure.

The body of lip seal 3 bears on the face of an annular, axially extending projection 1a of the opening in the housing 1 and is pressed against this projection 1a by a pressing ring 4 with associated bolt. The body is thus mounted in a groove-like recess facing the rotating shaft, in fixed axial position. A circumferential groove-like area or annulus 5 is formed between the projection 1a and a section of the housing opening surrounding the shaft 2 with narrow clearance 7. A bore 6 in the housing 1 leads to this area 5, which is on the side of the lip seal 3 that normally faces the high pressure in the housing, so that the area 5 can be connected to a pressure source. This medium for pressurizing will preferably be a medium that is already used in the process or that is present on the side that is normally under high pressure.

With further reference to FIG. 1, the housing 1 has an inside 1b where the working medium is at elevated pressure and an outside 1c at ambient pressure. The housing has a shaft bore with one end 1d closer to the inside 1b of the housing and another end 1e at ambient pressure. The chamber 5 has a first portion 5a adjacent to and in direct fluid communication with the gap 7 and a second portion 5b adjacent to and in direct fluid communication with the lip seal 3.

The medium supplied through the bore 6 is throttled considerably as it flows through the gap 7 between housing 1 and shaft 2 so that higher pressure can build up in area 5 than the pressure normally prevailing on this side of the lip seal 3. This higher pressure is adjusted to a constant value by means of external devices, where this value shall in any event be higher than the highest pressure occurring inside the housing. Since there is a constant pressure on the side of the lip seal 3 opposite the area 5, which is normally ambient pressure, there is a constant pressure differential at the lip seal 3 so that the flexible sealing lip 3a extending from the body portion of the lip seal maintains its optimum sealing effect at a constant level at all times. It can be seen that the sealing lip 3a has one side in sealing contact with the shaft 2 and an opposite side in fluid communication with the chamber 5. In addition, the lip seal 3 is kept clean by the medium flowing from the lip seal 3 through the gap 7 and any contaminants that enter the gap 7 are flushed out.

Figure 2:
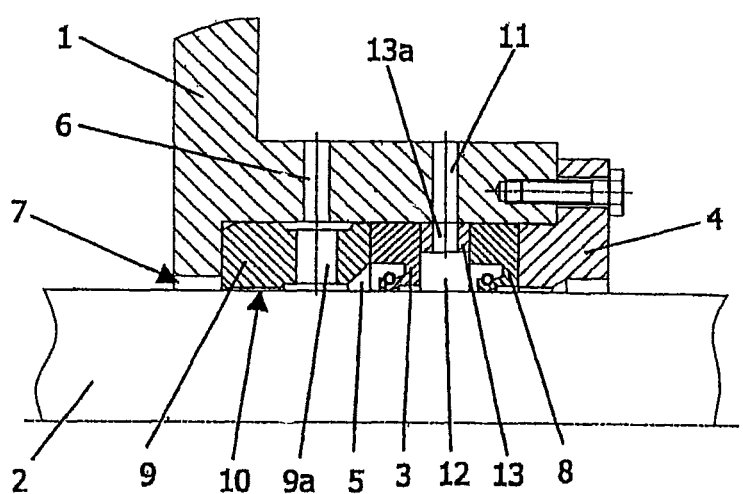
FIG. 2 is a sectional view of a sealing arrangement with two lip seals and a throttle ring.

FIG. 2 shows a further embodiment of the invention that is advantageous for higher pressure differentials between the two sides of the sealing arrangement. The same components as in FIG. 1 are also marked with the same references. Here, two lip seals 3 and 8 are mounted in series.

This embodiment shows by way of example a throttle ring 9 inserted between a projection on the side of the housing 1 on the side that is normally under higher pressure and the first lip seal 3. A very narrow gap 10 is provided between the side of the throttle ring 9 facing the area that is normally under higher pressure and the shaft 2, through which gap 10 the medium can be supplied from a pressure source through the bore 6 in the housing 1 and at least one, preferably radial, bore 9a in the throttle ring 9. This medium is throttled as it drains off, with the same function as described above, through the gap 10 so that a pressure adjusted to a constant value ensues in front of the lip seal and which is higher than the pressure on the side of the throttle ring 9 opposite the lip seal 3.

The same medium, or also a different medium can be supplied through a further bore 11 in the housing 1 into the area 12 between the two lip seals 3 and 8 and also adjusted to a constant value by means of external devices, but a value that is lower than the value of the pressure applied through the bore 6. Here, a spacer ring 13 is inserted between the two lip seals 3 and 8, which has at least one, also preferably radial, bore 13a through which the medium enters the area 12. The pressure applied through bores 6 and 11 is coordinated so that the pressure differential at each lip seal does not exceed a maximum value that can be pre-set and which is typically in the region of 2 bar. Thus, the maximum differential pressure for each lip seal can also be maintained with very high overall prevailing pressure differentials by arranging several lip seals in series in order to guarantee optimum tightness in this way over the longest possible period.

Figure 3:
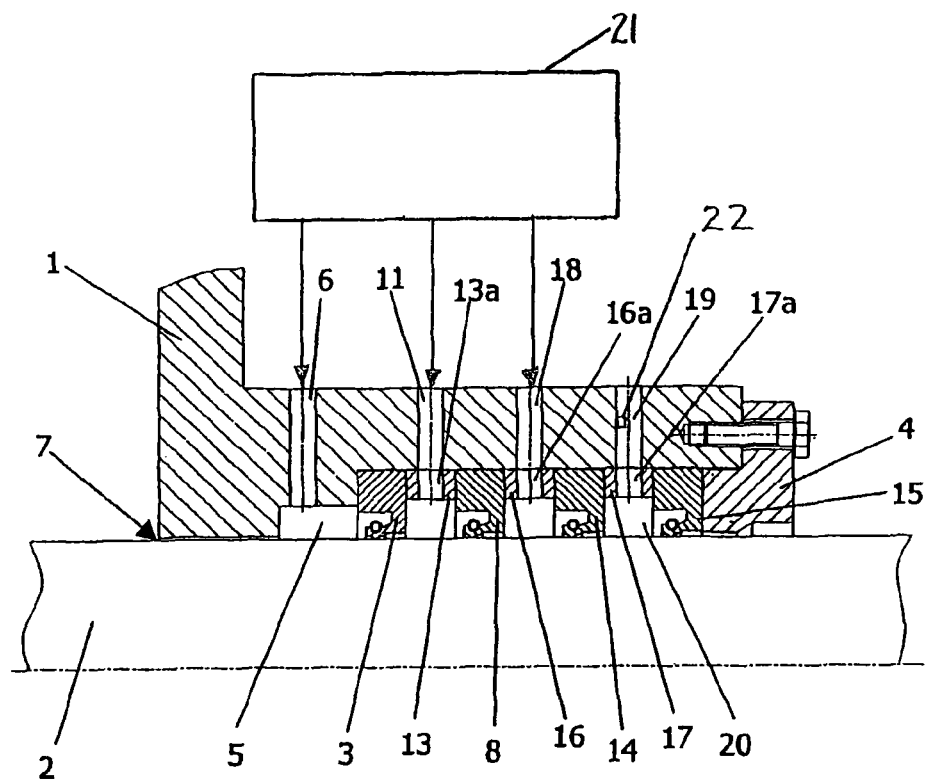
FIG. 3 shows a sectional view of a further embodiment, with four lip seals arranged in series.

A further extended embodiment of a sealing arrangement according to the invention is shown in FIG. 3. Here, four lip seals 3, 8, 14 and 15 are provided, of which the lip seal 3 closest to the area that is normally under higher pressure rests on a projection of the housing 1 and the other seals 8, 14 and 15, each separated from one another by spacer rings 13, 16 and 17 are pressed onto the rings. Each of the spacer rings 13, 16 and 17 has a least one, preferably radial, bore 13a, 16a and 17a. Thus, medium from a pressure source 21 can be fed through the bores 6, 11 and 18 in the housing into the area between the lip seals 3 and 8, and 8 and 14, respectively, and these areas can be subjected in this way to a pressure that is adjusted so as to be constant.

The bore 19 farthest away from the area that is normally under higher pressure does not serve as an example for further pressurizing, but for discharge of medium or another fluid that has escaped from the area that is normally under higher pressure, through the lip seals 3, 8 and 14 into the area 20 in front of the outermost lip seal 15. If a sensor device 22 for the medium and/or another process fluid is provided in the bore 19 itself or adjacent to this bore 19, any leaks at the sealing arrangement can thus be detected.

In addition or as an alternative to the medium for pressurizing the lip seals, grease or another lubricant can also be applied between any two seals in order to keep the lip seals supple.

The invention claimed is:

1. Sealing arrangement for a rotating shaft through a bore penetrating a housing, said housing having an inside containing a working medium at elevated pressure, a housing projection extending coaxially around the shaft away from the inside of the housing and defining said bore, and a housing outside at ambient pressure, said bore having an inner side facing said shaft and receiving a plurality of lip seals and an outer side exposed to said ambient pressure, comprising:
   a pressurized fluid chamber within the bore adjacent the shaft;
   a gap along the shaft, providing direct fluid communication from a first portion of the chamber closer to the inside of the housing to the working medium at elevated pressure inside of the housing;
   one of said lip seals with a sealing lip in contact with the shaft and facing a second portion of the chamber farther from the inside of the housing;
   a source of pressurized fluid delivered through a passage in the housing directly into the chamber; wherein the gap throttles outflow of pressurized fluid from the first portion of the chamber to the working medium inside of the housing and thereby maintains sufficient fluid pressure in the second portion of the chamber to load the sealing lip against the shaft;
   at least one other pressurized fluid chamber arranged axially in series in a direction away from the inside of the housing and situated between the bore and the shaft, each of the other chambers having a first portion closer to the inside of the housing and a second portion farther from the inside of the housing, and a respective other of said lip seals arranged along the shaft, each of said other lip seals facing the second portion of a respective other pressurized chamber, and each having a respective sealing lip in contact with the shaft and facing the inside of the housing;
   a further lip seal farthest from the inside of the housing with an associated chamber between it and an adjacent other lip seal next closer to the inside of the housing with a respective associated pressurized chamber; and
   a discharge passage leading from the associated chamber of the further lip seal to said ambient pressure through which discharge passage pressurized fluid escaping from the chamber of the next closer lip seal is discharged.

2. Sealing arrangement according to claim 1, wherein said one lip seal is mounted in a recess of the bore wall facing the rotating shaft adjacent said chamber and said passage in the bore wall is connected to only said chamber.

3. Sealing arrangement according to claim 1, comprising a throttle ring in the recess within the housing bore, forming said gap and at least a part of said chamber associated with the lip seal.

4. Sealing arrangement according to claim 3, wherein the throttle ring has a bore forming at least a portion of the passage connectable to the pressure source.

5. Sealing arrangement according to claim 1, including a sensor device provided in or connected to the discharge passage.

6. Sealing arrangement according to claim 1, wherein each lip seal has a body portion mounted in a recess facing the rotating shaft within the housing bore whereby the body portion is retained in fixed axial position within the bore; and a flexible sealing lip extends from the body portion, having one side in sealing contact with the shaft and an opposite side in fluid communication with a chamber.

7. Sealing arrangement according to claim 6, comprising a throttle ring in the recess within the housing bore, forming said gap and at least a part of said chamber associated with the lip seal.

8. Sealing arrangement according to claim 1, wherein each lip seal is mounted in a recess facing the rotating shaft within the housing bore and the housing has at least one other passage connectable to another source of pressurized fluid in fluid communication with the chamber of at least one other lip seal.

9. Sealing arrangement according to claim 8, comprising a throttle ring in the recess within the housing bore, forming said gap and at least a part of said chamber associated with the lip seal.

10. Sealing arrangement according to claim 9, wherein the throttle ring has a bore forming at least a portion of the passage connectable to the pressure source.

11. Sealing arrangement according to claim 1, wherein each lip seal is mounted in a common circumferential recess facing the rotating shaft and formed by the housing and a pressing ring is advanced into the housing, thereby axially retaining the series of lip seals.

12. Sealing arrangement for a rotating shaft through a bore penetrating a housing, said housing having an inside containing a working medium at elevated pressure and an outside at ambient pressure, said bore having an inner side facing said shaft and receiving a plurality of lip seals, one of which is closest to the inside of the housing, and an outer side exposed to said ambient pressure, comprising:
   a pressurized fluid chamber within the bore adjacent the shaft, between said closest lip seal and the inside of the housing;

a gap along the shaft providing fluid communication between the chamber and the working medium inside of the housing;

wherein said closest lip seal has a sealing lip facing the inside of the housing, fluidly exposed to the chamber, and in contact with the shaft;

the gap throttles outflow of pressurized fluid between the chamber and the working medium inside of the housing and thereby maintains fluid pressure in the chamber sufficient to load the sealing lip against the shaft;

a source delivers pressurized fluid to pressurize the chamber at a pressure higher than the pressure of the working medium inside the housing;

said source delivers pressurized fluid to the chamber through a passage in fluid communication with only said chamber;

said pressurized fluid is the same medium as the working medium contained in the housing;

the throttling by the gap maintains a constant pressure of the pressurized fluid in the chamber and on the lip of the lip seal;

one of said lip seals is farthest from the inside of the housing and is in fluid communication with an associated farthest chamber within the bore adjacent the shaft; and a discharge passage leads from the associated chamber of the farthest lip seal to said ambient pressure through which discharge passage pressurized fluid escaping from the chamber of the next closer lip seal to the housing is discharged.

* * * * *